United States Patent [19]
Arciniegas

[11] Patent Number: 5,913,460
[45] Date of Patent: Jun. 22, 1999

[54] PLASTIC LID WITH FUSED POUR SPOUT AND A METHOD AND APPARATUS FOR MAKING SAME

[76] Inventor: Alfonso N. Arciniegas, 7807 Beckwith Rd., Morton Grove, Ill. 60053

[21] Appl. No.: 08/841,868

[22] Filed: May 5, 1997

[51] Int. Cl.⁶ .................................. B67D 3/00; B65D 5/72
[52] U.S. Cl. .......................... 222/530; 222/529; 222/538; 222/572
[58] Field of Search .................................. 222/529, 530, 222/538, 572

[56] References Cited

U.S. PATENT DOCUMENTS

| | | | |
|---|---|---|---|
| 4,236,629 | 12/1980 | Dwinell | 222/529 |
| 4,475,274 | 10/1984 | Beckstrom et al. | 222/545 |
| 4,981,239 | 1/1991 | Cappel et al. | 222/572 |
| 5,088,632 | 2/1992 | Odet et al. | 222/538 |
| 5,431,306 | 7/1995 | Reid | 222/571 |
| 5,542,586 | 8/1996 | Stockwell | 222/538 |
| 5,711,441 | 1/1998 | Adams et al. | 222/541.9 |

*Primary Examiner*—Andres Kashnikow
*Assistant Examiner*—Keats Quinalty
*Attorney, Agent, or Firm*—Myers & Associates, Ltd.

[57] ABSTRACT

A method and apparatus for fusing a pour spout to the surrounding surface of a lid or container during the molding process. During molding the hot molten plastic of the lid or container contacts. A relatively thick rim portion at the bottom of the pour spout to meet the thick rim portion and create fusing during the cooling of the mold. The pour spout has a flexible section to permit a portion of the fused pour spout to be moved between collapsed and extended positions.

17 Claims, 9 Drawing Sheets

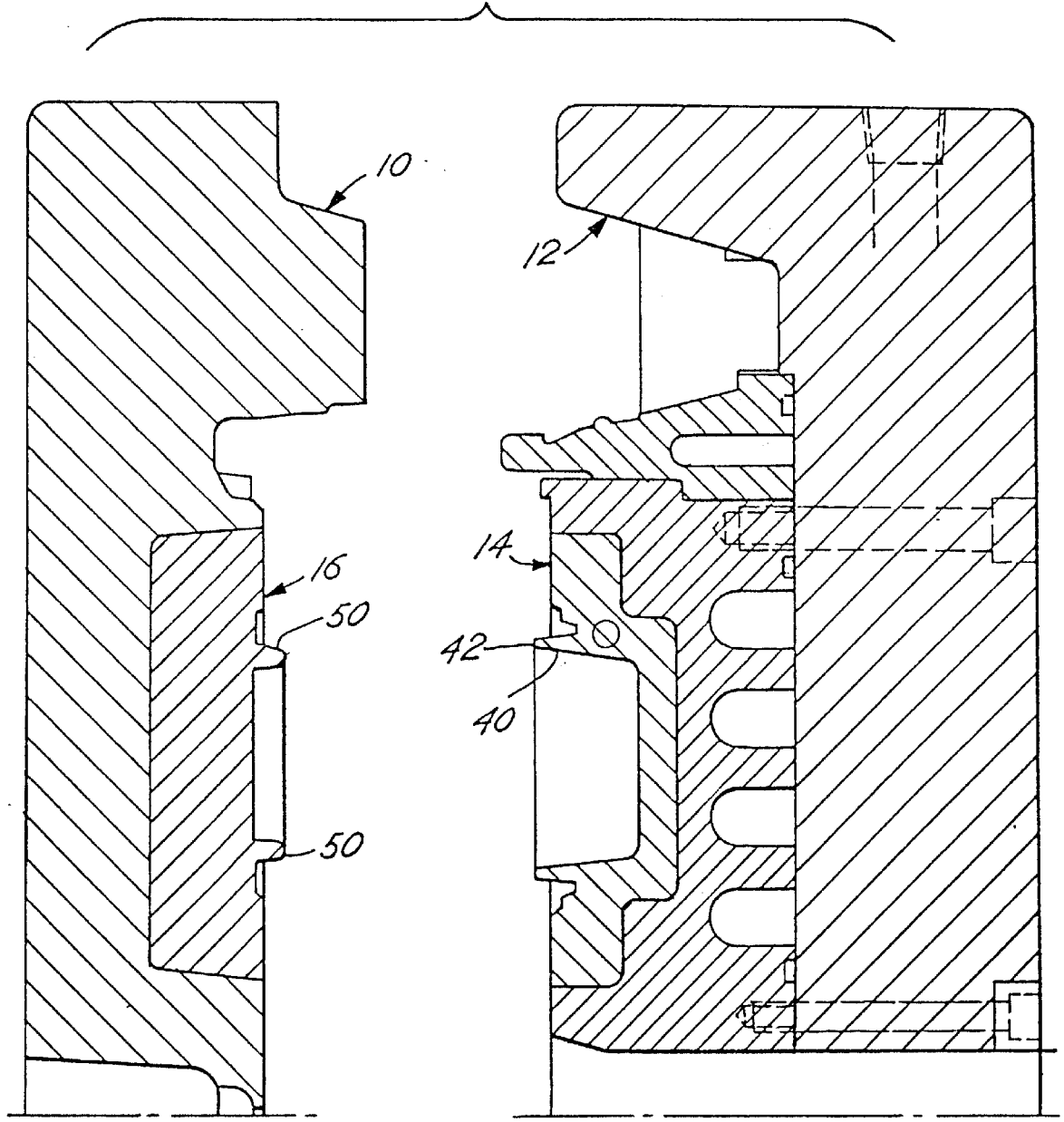

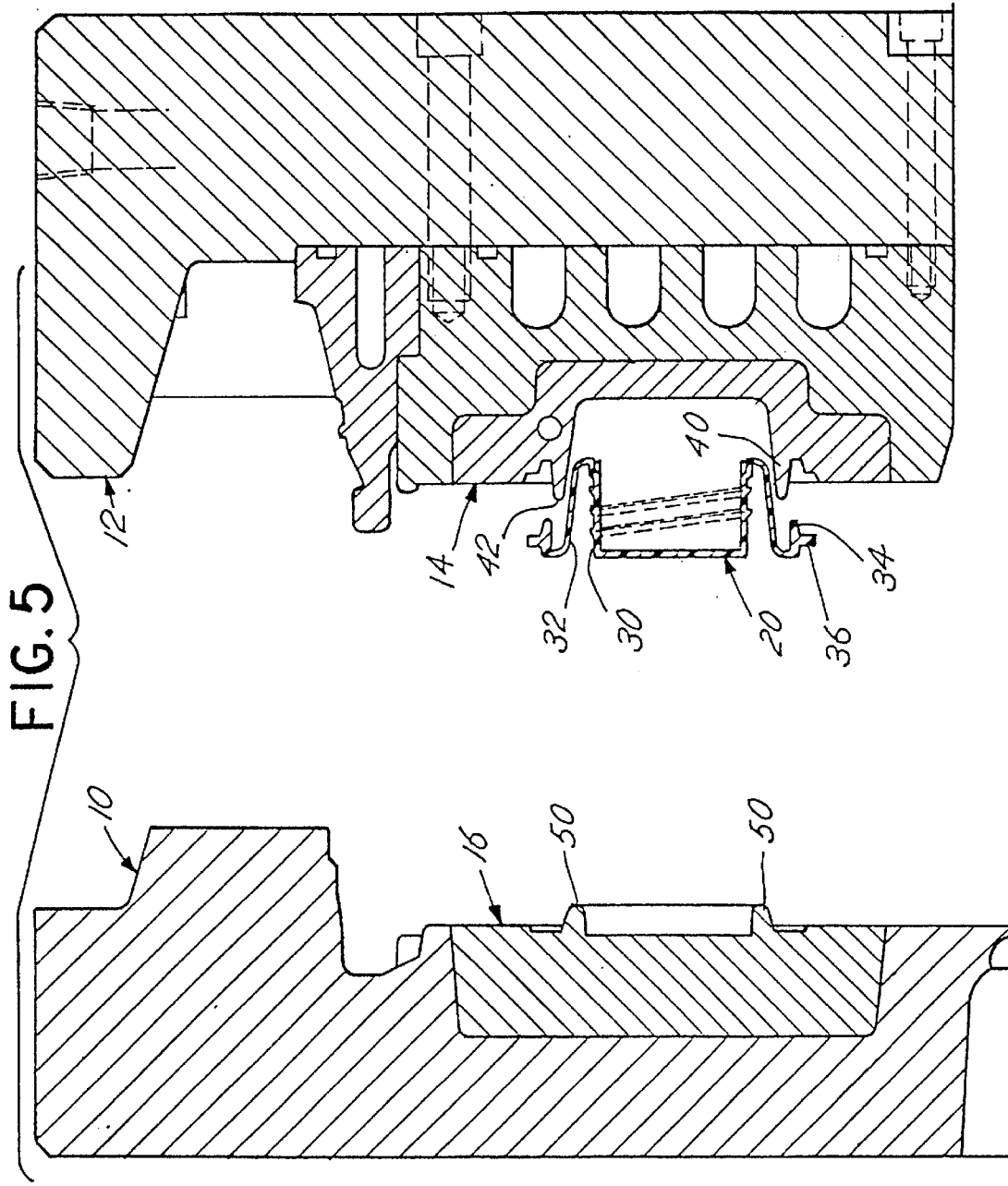

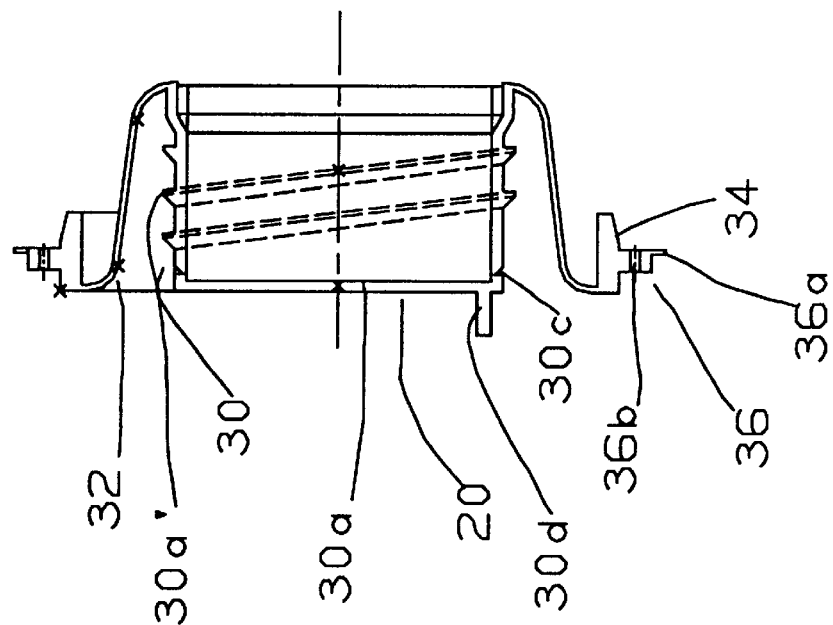
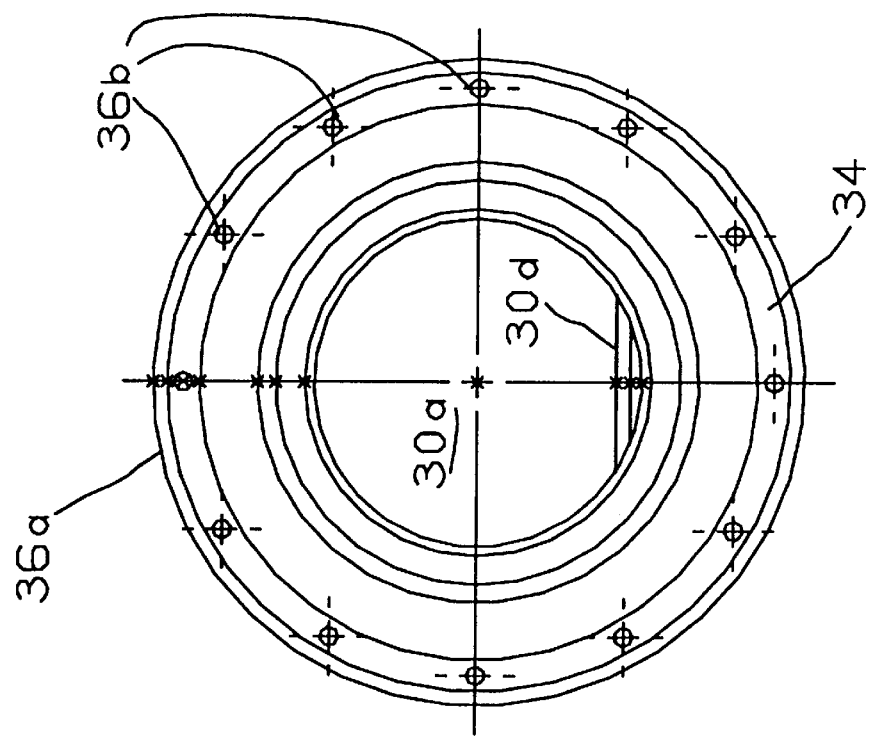
Fig. 5a

PLASTIC LID WITH FUSED POUR SPOUT AND A METHOD AND APPARATUS FOR MAKING SAME

BACKGROUND OF THE INVENTION

The present invention relates to a fused combination of a plastic lid and a pour spout. While the invention may have wider application, it will be described here in conjunction with a plastic lid and a flexible pour spout fused to the lid which can be collapsed to a position relatively flat with the lid and can be pulled out to an extended position when it is desired to pour liquid from a bucket which is closed on the top by the lid. A preferred embodiment of the invention will be described relative to a combination of a plastic lid intended to close a plastic bucket, and a plastic pour spout fused to the lid and movable between a collapsed position and an extended position.

Such a pour spout cannot be made of a material which has the same thickness as the lid. Such a pour spout must have a relatively thin spout section to permit it to be pressed into a generally flat or collapsed position when not in use, and to be pulled out to an extended position when the spout is to be used for pouring from a bucket on which the lid is attached. In contrast, the plastic lid material must be much more stiff than the pour spout.

It has been known heretofore to manufacture a pour spout attached to a molded lid. Thus, the lid and pour spout are molded separately, and then an attachment operation is carried out to attach the pour spout to the lid. Where a pour spout is to be used, the lid must be molded with a fitting to which the pour spout can be attached. Such a fitting will normally include a solid portion which can be punched out to create a hole where the pour spout attaches. The pour spouts have their own screw cap or the like for closure. If no pour spout is utilized, the lid can function as a normal closure of an open top bucket.

Known pour spouts comprise relatively soft, thin plastic in the spout area combined with a relatively rigid base portion which attaches to the lid fitting. Such base portion may be made of metal, or relatively rigid plastic. Known pour spouts also have screw-on lids or caps, so the spout can be opened and closed. In some cases, the spout will snap onto a fitting portion on the lid, while in other cases the spout may screw on to the lid fitting. In all such cases, the pour spout is attached to the lid after the lid has been molded, and such pour spouts are relatively expensive.

The known pour spouts have significant disadvantages. As noted above, they are relatively expensive, and of course an attachment operation is required after the lid is molded. Beyond that, plastic bucket and lid combinations are often required to be subjected to drop tests to assure that filled bucket can withstand a given drop without the lid disengaging or any of the contents being lost. The various known spouts as described above which snap or screw on to a lid fitting have not performed well when subjected to required drop tests. In addition, there exists a theft problem because the relatively expensive pour spout can easily can be removed from the lid fitting.

The present invention involves a novel method of fusing a pour spout to a lid during the molding of the lid. Thus, the pour spout is molded and is placed in a special steel mold insert which is positioned in the lid mold. When the lid is molded, the previously molded pour spout is molded One of many advantages of the invention is that the molded pour spout is relatively inexpensive due to its simplicity. The pour spout comprises the usual thin and flexible spout portion, and a relatively thick flange or rim at the bottom. During the molding of the lid, the molten plastic is permitted to surround a relatively thick flange or rim of the pour spout to fuse the base of the pour spout to the lid. At the same time, the mold inserts serve to prevent the molten plastic from engaging the thin spout portion of the pour spout which would be destroyed if contacted by the molten plastic. The pour spout used in the present invention has the usual screw-on cap or the like for opening and closing the spout, and it is collapsible to a flat position as in known in the art.

The pour spout used in the present invention is quite simple and inexpensive compared to the known pour spout which is attached to a lid fitting after the lid has been molded. As described above, the pour spout essentially comprises only the usual flexible spout portion with a cap, and a relatively thick rim or flange at the bottom which is fused to the lid during the molding of the lid. Such a pour spout could not be fused to a lid during the molding of the lid without the special mold inserts which comprise an element of the present invention, because the thin portion of the spout would be destroyed if it were contacted by the molten plastic which forms the lid. Another advantage of the present invention is that fusing of the pour spout and lid during the molding of the lid creates a bond between the pour spout and lid which is especially strong so as to provide significantly improved drop test results. Moreover, the theft problem is eliminated since the pour spout is not removable.

The mold inserts of the present invention comprise a pair of rigid inserts, which may be steel, which fit into the respective halves of a lid mold. In accordance with the preferred embodiment to be described herein, the mold inserts are round, and approximately four inches in diameter. The mold inserts open and close with the two halves of a lid mold, and a molded pour spout is positioned in one of the inserts and held tightly therein when the lid mold and mold inserts are closed. The inserts are designed so that the hot plastic will flow around a relatively rigid base portion of the pour spout to fuse it to the lid being molded, while the inserts prevent the molten plastic from engaging the soft, flexible portion of the previously molded pour spout. The mold inserts are also water cooled to enable them to protect the flexible portion of the pour spout.

There is one prior art technique which bears a superficial resemblance to the present invention. It is known to mold a plastic lid, and to connect a molded pour spout to such a lid by fusing or welding the pour spout to a fitting formed on the lid. Such a method involves attaching the pour spout to a lid after the lid is molded, which is entirely different from the present invention. Beyond that, the final product is very different because the known fusing technique only affects fusing of the spout to the lid at the very bottom surface of the spout. In contrast, the final product of the present invention comprises a spout and lid combination where the spout is fused to the lid around many different surfaces all the way around a rim flange of the spout and not just around a bottom surface. Such extensive fusing of the pour spout to the lid can only be achieved using the present invention where the spout is fused to the lid during the molding of the lid.

One of the important features of the present invention is the use of a rigid inserts to pinch against the thin portion of the previously molded pour spout to create a seal which prevents the flow of molten plastic past the seal. The lid inserts when closed create steel against steel contact, but the mold inserts are designed so that when closed they pinch against the thin section of the molded pour spout without engaging so hard that they destroy the spout.

In the foregoing manner, the pair of mold inserts, which hold the molded pour spout, pinch the thin portion of the pour spout to seal off and protect the thin pour spout section from being contacted by molten plastic while at the same time the molten plastic is permitted to flow around a relatively thick rim or flange portion at the bottom of the pour spout. The relatively thick rim or flange portion of the pour spout, which is thick enough not to be damaged by the molten plastic, is thereby fused to the lid during the molding of the lid. The hot plastic melts the relatively thick rim portion at the bottom of the pour spout to fuse the same with the adjacent portion of the lid as the lid is molded.

During the molding of the lid, the mold inserts are designed to be in close proximity to the thin section of the previously molded pour spout so that, in addition to sealing off the thin section from the molten plastic, the inserts, which are water cooled, serve to cool the thin section of the pour spout to avoid damage which could otherwise be caused by conduction of heat from the relatively thick rim section of the pour spout which is exposed to the molten plastic. It is known in the art to water cool mold inserts, but such inserts have not previously been used for a purpose as in the present invention.

Based on the foregoing description, the pair of mold inserts serve two purposes. First, when the lid mold halves are closed, the closed mold inserts pinch against a thin section of a molded pour spout to seal the same off from contact with the molten plastic, and in addition the water cooled inserts cool the thin section of the spout to protect it against heat conducted from the rim portion of the spout which is exposed to the molten plastic. The mold inserts preferably fit close against the thin section of the pour spout to cool the latter.

The foregoing and other objects and advantage of my invention will be apparent from the following description of a preferred embodiment thereof, taken in conjunction with the accompanying drawings.

DESCRIPTION OF THE DRAWINGS

FIG. 4 is a fragmentary view, partly in section, showing a pair of lid mold half sections in a mold-open position, there being shown a pair of mold inserts positioned in respective ones of the lid molds;

FIG. 5 is a view similar to FIG. 4 showing a previously molded pour spout partially inserted into one of the mold insets;

FIG. 5a show a previously molded pour spout with the inserts in cross section;

Now, in order to acquaint those skilled in the art with the manner of making and using my invention, I shall describe, in conjunction with the accompanying drawings, a preferred embodiment of my invention.

DETAILED DESCRIPTION OF THE INVENTION

Figure 6:
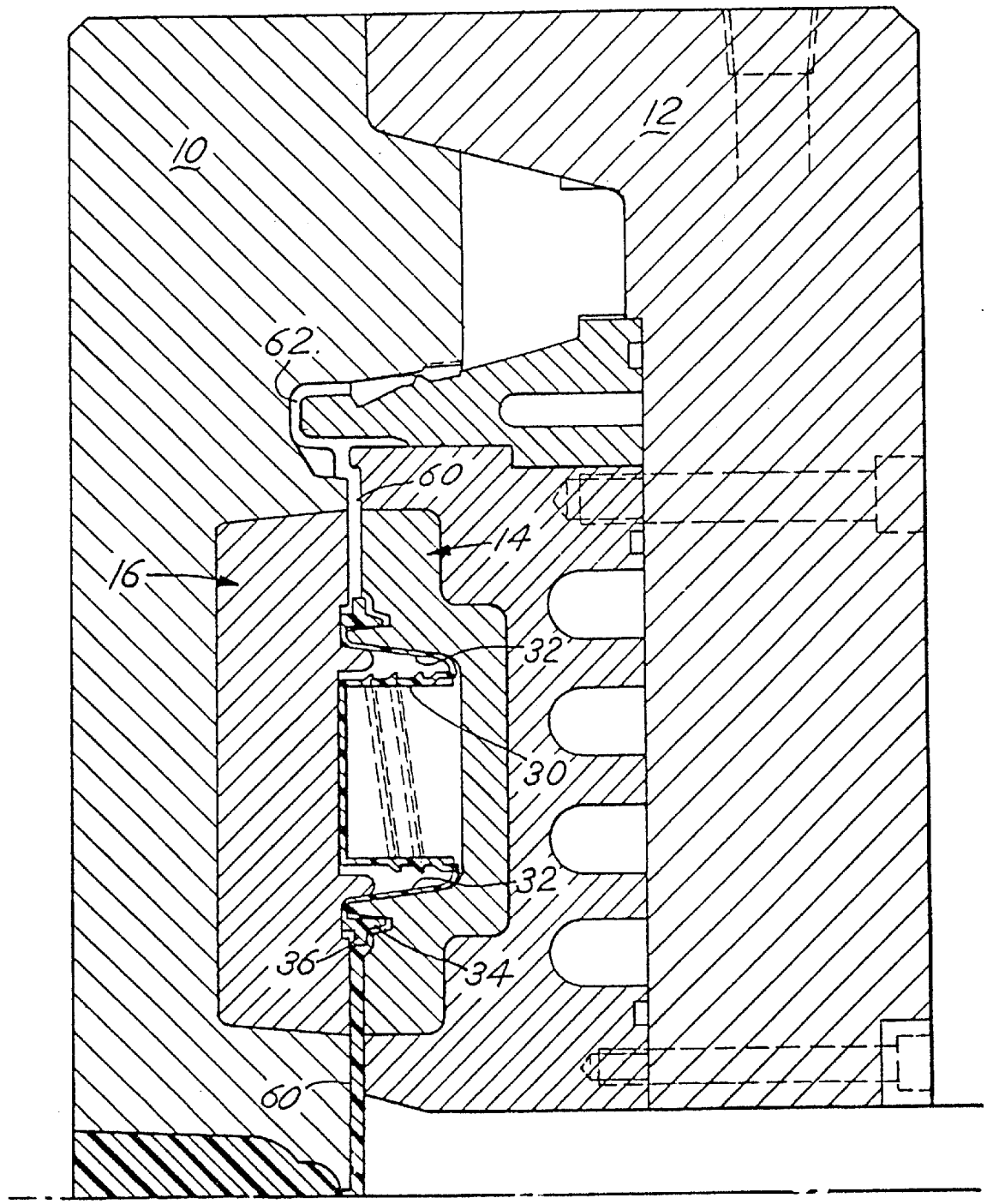
FIG. 6 is a view showing the molds of FIG. 5 in a mold-closed position during a plastic injection cycle.

Reference is made to FIGS. 4, 5 and 6. FIG. 4 shows lid mold half sections, a cavity side of the lid mold being shown at 10 and the core side being shown at 12. Such molds are normally made of steel, and in the preferred embodiment being described, mold inserts are also made of steel. FIG. 4 shows in cross-sections of a cavity side mold inserts 14 and a core side mold inserts 16.

Figure 8:
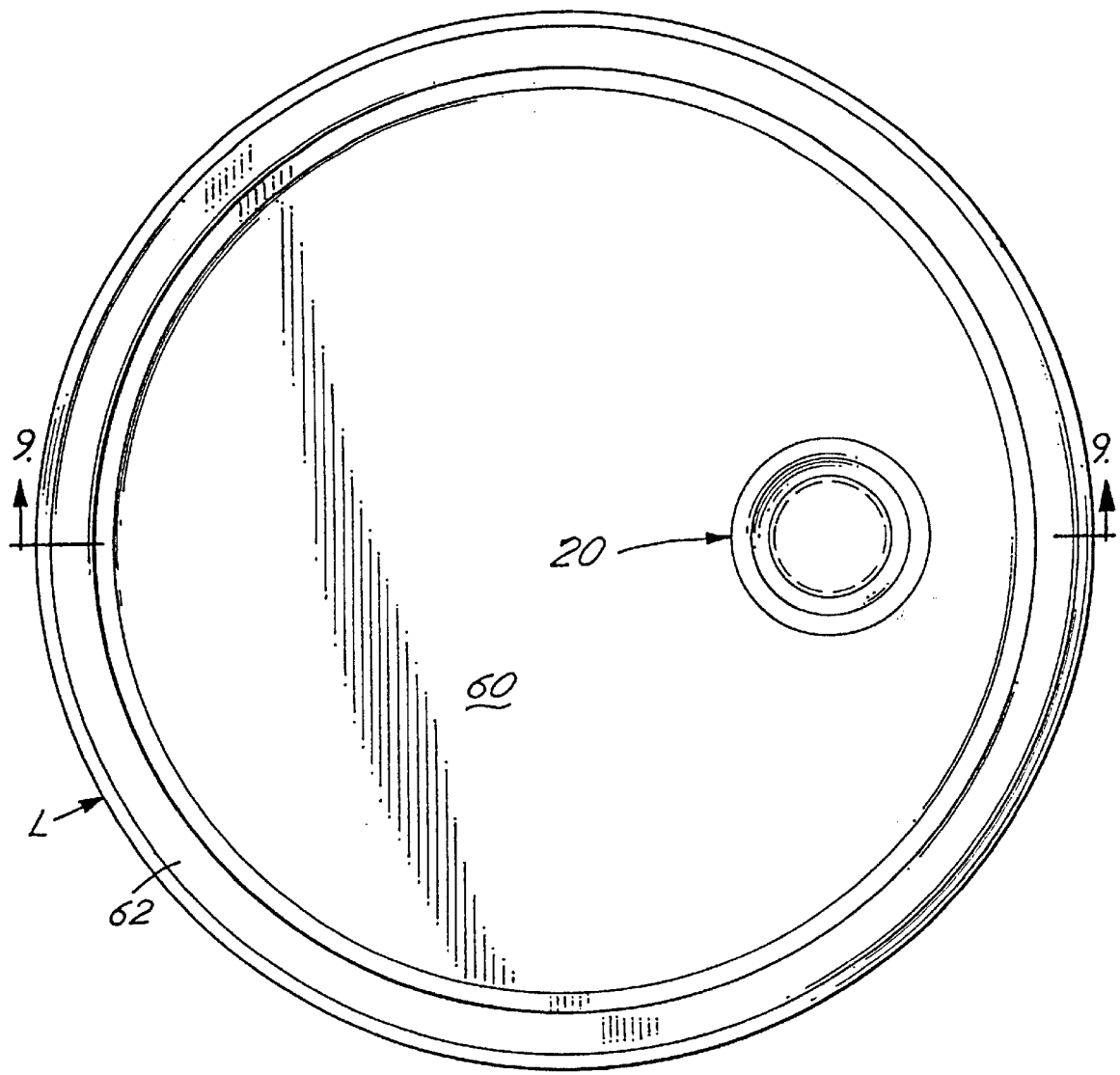
FIG. 8 is a top plan view of a molded lid having a previously molded pour spout which was fused to the lid during the molding of the lid in accordance with the present invention.
Figure 9:
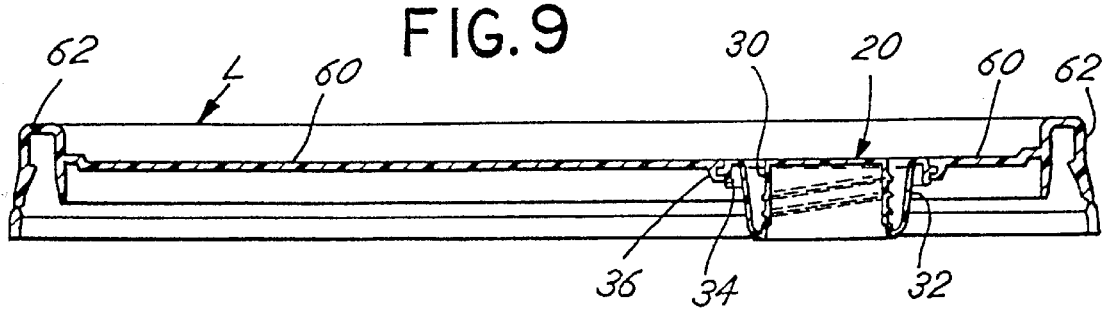
FIG. 9 is a vertical section taken along the line A—A of FIG. 8 showing the molded lid and fused pour spout, a cap for the pour spout not being shown.

FIG. 8 is a top plan view of a molded lid and a fused pour spout 20, the lid and spout being shown in vertical section in FIG. 9.

In the preferred embodiment being described, the pour spout 20 is located radically out from the center of the lid on the section line A—A as shown in FIG. 8. During the molding of the lid, the molten plastic is injected at the center of the like mold and flows radically outwardly to the outer periphery of the lid mold. As the plastic flows radically outwardly, the previously molded pour spout will be fused to the lid when the plastic reaches the location of the pour spout as best shown in FIGS. 8 and 9.

Referring again to FIG. 4, the drawing shows the lid mold half sections in the open position with the mold inserts positioned in the respective lid molds in preparation for the molding of a lid. FIG. 5 is similar to FIG. 4 but it further shows the previously molded pour spout 20 being inserted into the cavity side mold insert 14. As shown in FIG. 5, the previously molded pour spout has an outer threaded neck portion 30 having threads 30a' to receive a threaded cap (not shown) for covering the spout, a soft, thin section 32, an annular rim 34, and an annular flange 36. The flange 36 is provided with a tip or thin end section 36a' to ensure fusion of part 36 with the molded lid wall or part 60 and is provided with a bore or hole means 36b to ensure further fusion between part 36 and the part 60. To open the spout 20, the top flat plate thin portion 30a of the spout neck portion 30 is attached to the cylindrical wall of the threaded portion 30b which is provided at its end with a cylindrical thinner wall section 30c to allow removal of the plate portion 30a. Further there is provided a graspable tab 30d at the edge of the plate portion 30a. When the tab 30d is pulled away from the neck portion 30 the thin portion 30c is torn away from the cylindrical portion 30b allowing removal of the top portion 30a and exposing the inner contents of the container or can which can now be poured out of the container or can.

As will be described more fully later herein, it is the relatively thick rim 34 and flange 36 which are contacted by molten plastic during the molding of a lid and are fused to the lid, caused by melting and fusing between the hot plastic and the cold plastic of the pour spout rim and flange. The design of the rim 34 and flange 36 may vary, the important point being that a relatively thick plastic rim or the like is required at the "bottom" of the previously molded pour spout where the spout is fused to the lid. The remainder of the pour spout, especially including the very thin spout portion 32, is protected from contact with molten plastic in accordance with the present invention. FIG. 5 shows the pour spout 20 in its collapsed position which is the position of the pour spout during the molding of the lid. As is known in the art, the neck section 30 may be pulled out to an extended position for purposes of pouring liquid from a container.

Figure 3A:
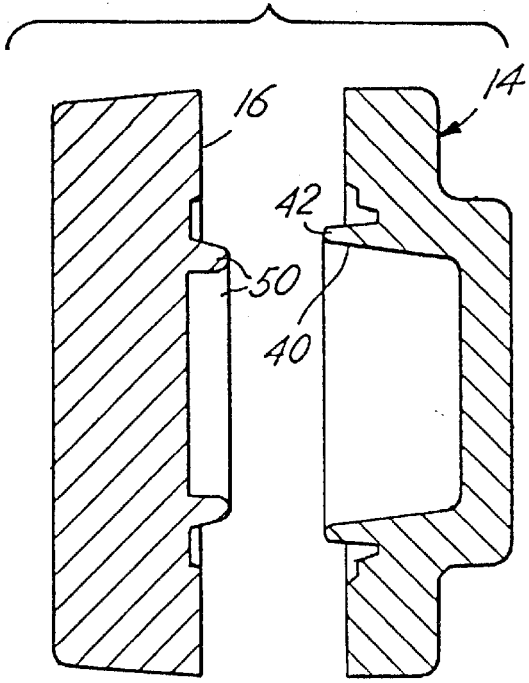
FIG. 3a is a sectional view showing a pair of mold inserts in a mold-open position.
Figure 3B:
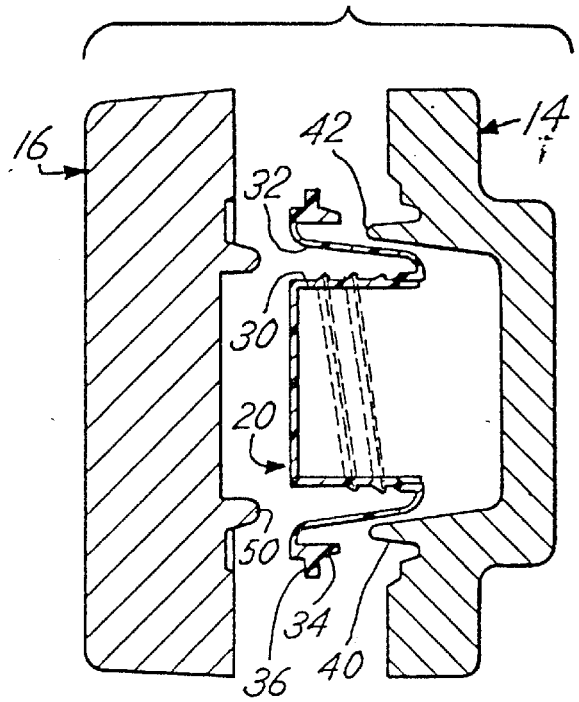
FIG. 3b is a view similar to FIG. 3a showing a previously molded pour spout being inserted into a cavity on one's steel insert.
Figure 3C:
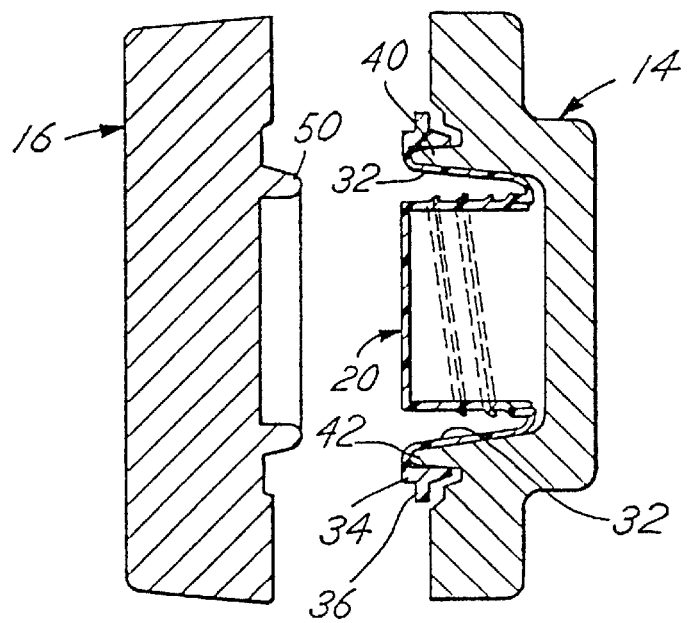
FIG. 3c is a view similar to FIG. 3b showing the pour spout fully inserted onto the mold insert in a position suitable for closing of the mold.

Reference is now made to FIG. 3a through 3e. FIG. 3a shows the mold inserts 14 and 16 in a mold-open position. FIG. 3b show the mold inserts in a open position with the molded pour spout being inserted into the cavity side insert 14. FIG. 3c shows the pour spout 20 fully inserted into the cavity side inset 14 in preparation for a lid molding cycle. The cavity side insert 14 includes an annular projecting rim 40 having a rounded outer annular portion 42. As shown in FIGS. 3b and 3c, the projecting annular rim 40 fits radially inwardly of the annular rim 34 on the molded pour spout, and the rounded out annular portion 42 of the insert engages against the thin spout section 32 in the area where the thin spout section connects with the rim 34. As shown FIG. 3c, the relatively thick rim 34 and flange 36 on the molded pour spout are positioned in an annular space in the mold insert 14 radially outwardly of the annular rim 40.

Figure 3D:
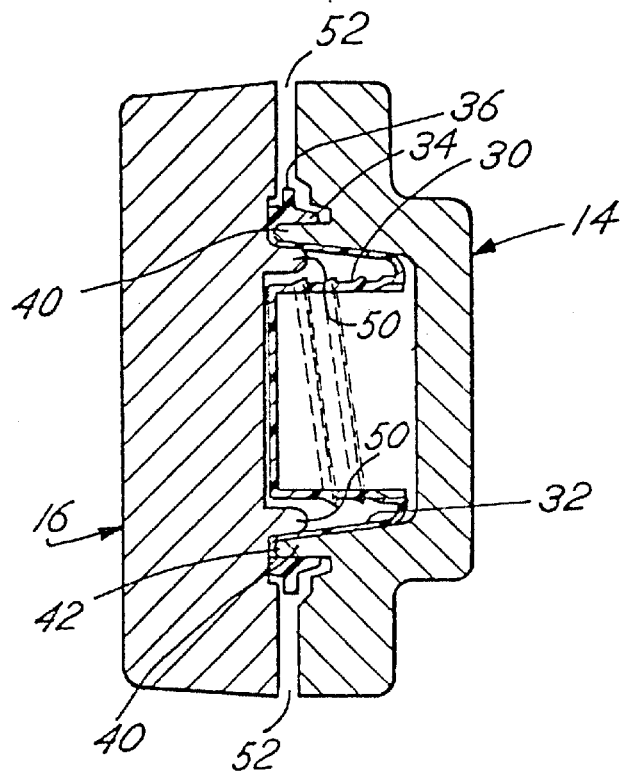
FIG. 3d shows the mold inserts in a closed position where a relatively thick rim portion at the bottom of the pour spout will be exposed to molten plastic during the molding of a lid, while opposed portions of mold inserts pinch against a thin portion of the pour spout adjacent the relatively thick rim portion to seal off the thin portion of the spout from exposure to molten plastic.

FIG. 3d shows the mold inserts 14 and 16 in a mold-closed position as during plastic injection. The core side mold insert 16 has a projecting annular rim 50 which in the closed position fits closely inside the rim 40 on the insert 14, leaving just enough space to accommodate the thin wall of pour spout section 32. FIG. 3d also illustrates how in the mold-closed position the out portion 42 of the projection annular rim 40 on insert 14 engages against the mold insert 16 by an amount sufficient to pinch the thin spout wall 32 between the insert 16 and the outer portion 42 of projecting rim 40.

As described earlier, in the mold-close position, the lid mold halves shown at 10 and 12 in FIG. 5 will engage steel to steel, but the mold inserts 14 and 16 engage by an amount sufficient to pinch the thin spout wall 32 to create a seal, but not so much as to damage that thin wall. The purpose of the pinching can be seen in FIG. 3d. The annular space shown at 52 represent the space in which molten plastic will flow between the mold inserts 14 and 16 during lid molding operation. It can be seen from FIG. 3d that as molten plastic flows into annular space 52, it will fill the space 52 and will also flow around the spout rim 34 and spout flange 36. The plastic in space 52 of the lid wall and the molten plastic surrounding spout rim 34 and spout flange 36 will partially melt the latter and use it to fuse with the lid wall which surrounds the spout rim 34 and flange 36. Thus, as the lid is molded, the lid wall surrounding pour spout 20 is fused to the rim and flange portions of the pour spout.

Figure 3E:
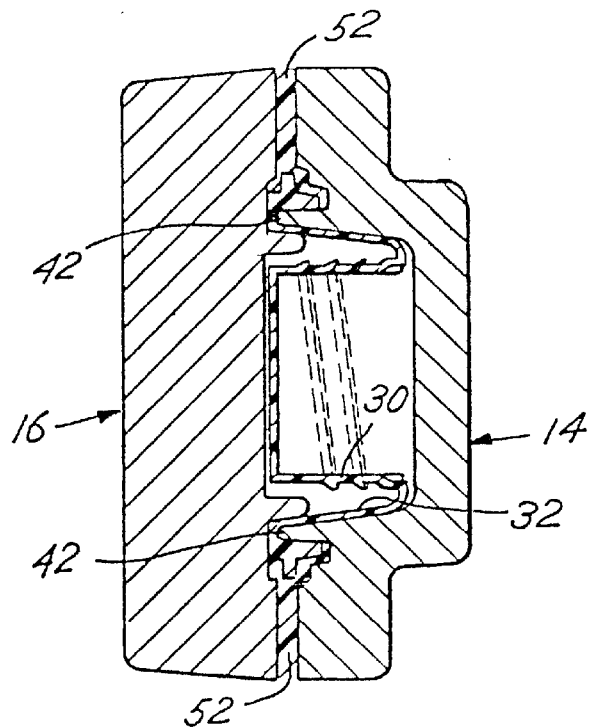
FIG. 3e show the mold inserts during plastic fusing of the pour spout to the plastic lid.

FIG. 3e represents a showing of the molten plastic filling the open spaces created by the mold and mold inserts in their closed position of FIG. 3d. FIGS. 3d and 3e further show how the pinching of the thin walled section 32 of the pour spout adjacent its rim 34 creates an annular seal so the molten plastic flowing radially into the annular opening 52 is prevented from flowing past the outer portion 42 of projecting rim 40 of inset 14 and is thereby prevented from contacting the thin wall section 32 of the pour spout. As described earlier the inserts 14 and 16 are preferably water cooled so they will cool the thin wall 32 of the pour spout and protect it from heat conducted from the rim portion 34 of the pour spout 20.

Figure 7:
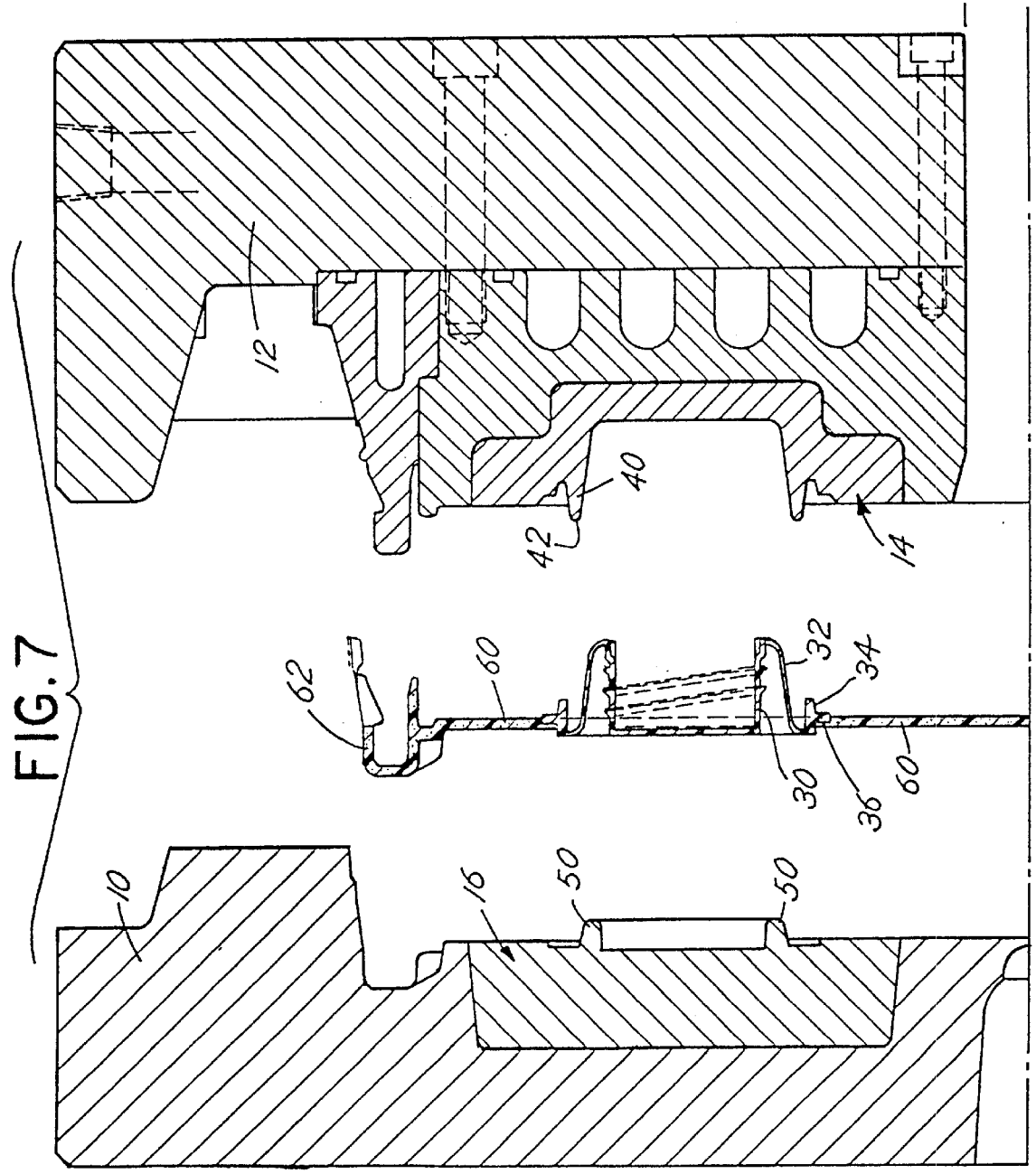
FIG. 7 is a view showing the molds of FIG. 6 in a mold-open position with a plastic lid ejected therefrom, the lid being fused with the previously molded pour spout.

FIGS. 6 and 7 further illustrate the method and mold inserts of the present invention. FIG. 6 shows the lid mold half sections 10 and 12 in their closed position, and thus they illustrate a mold cavity which defines one half of the lid, including the mold inserts 14 and 16 which control the fusing of the lid wall to the annular rim 34 and flange 36 of the pour spout while protecting the spout thin-walled section 32 so it is not engaged by the molten plastic. FIG. 6 shows a molded lid wall 60 including an outer peripheral lid rim portion 62, and as previously described the lid wall 60 surrounds the pour spout 20 and is fused to the annular spout rim 34 and flange 36 during the molding of the lid, FIG. 7 shows the lid mold halves 10 and 12 in an open position with the molded lid and fused pour spout combination being ejected from the mold.

FIGS. 8 and 9 further illustrate the molded lid L having a rim portion 62 and flat wall portion 60. FIG. 9 comprises a full section of the lid L showing the location of the fused pour spout 20. Of course, the location of pour spout 20 may vary. The lid shown in FIG. 9 is of a known design, and the rim portion 62 is configured to fit down tightly over the open upper end of a plastic bucket. A threaded cap (not shown) fits one the upper end of the threaded neck portion 30 of the pour spout.

The pour spout 20 is shown in its collapsed or flat position in FIG. 9 and when it is desired to use the same for pouring, it is pulled to an extended position which is permitted due to the soft, flexible section 32 as is known in the art.

Figure 1:
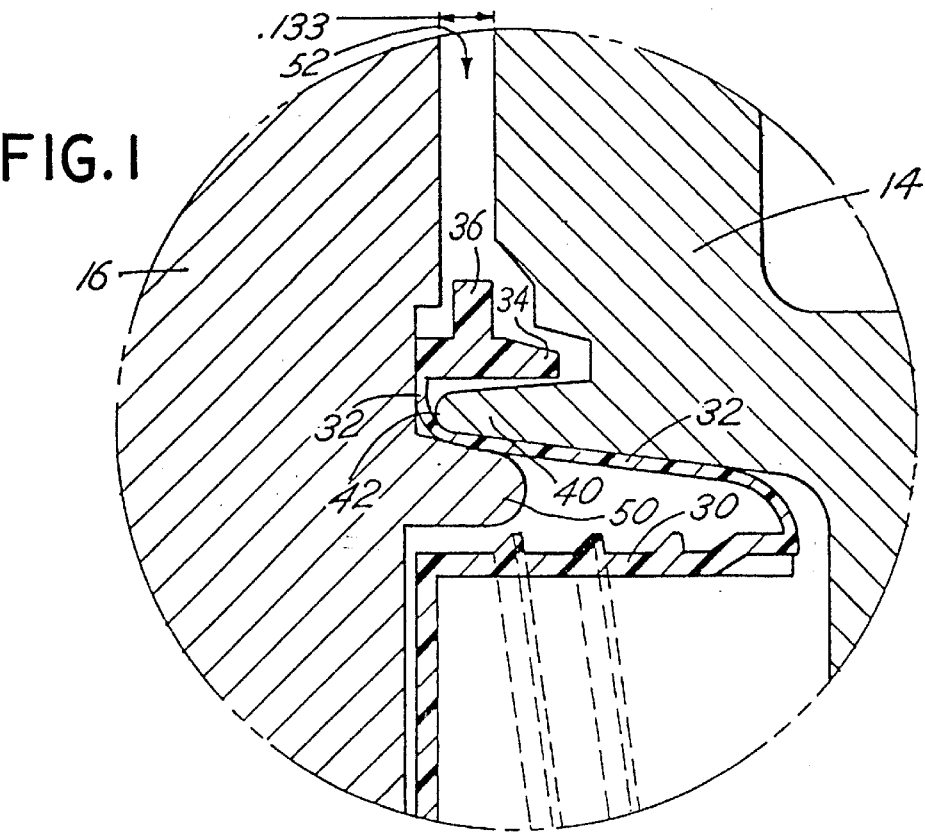
FIG. 1 is a fragmentary, sectional view showing a pair of mold inserts with a previously molded pour spout positioned therebetween, the mold inserts being shown approaching but not yet in a fully closed position.
Figure 2:
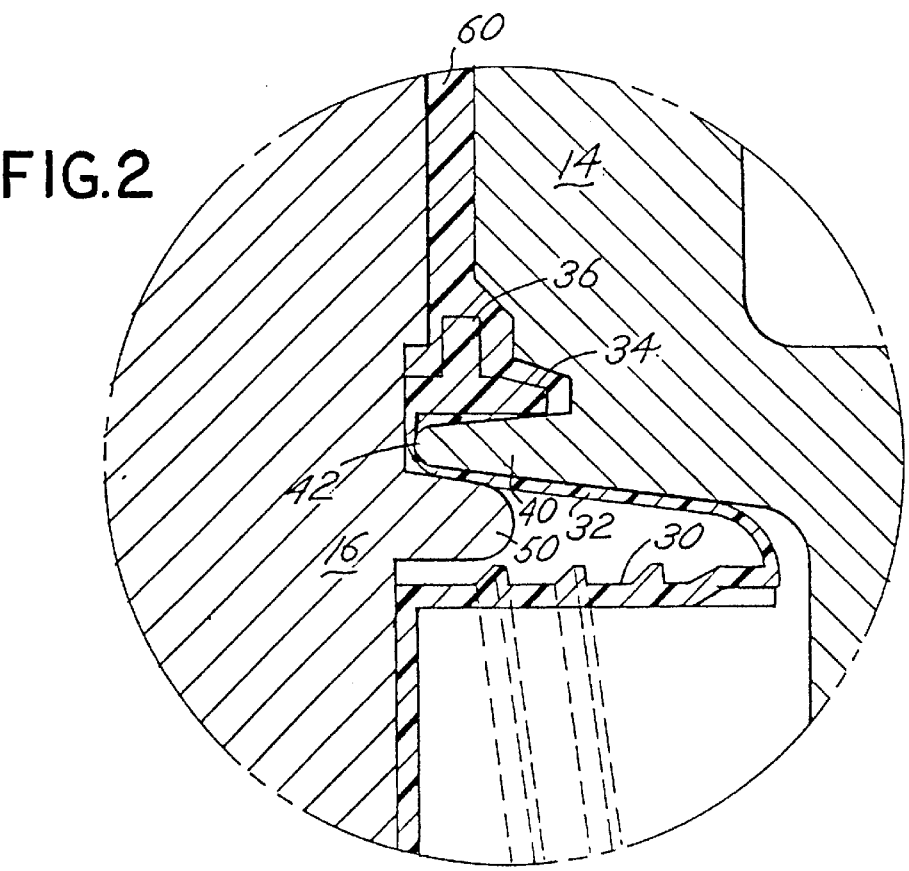
FIG. 2 is a fragmentary, sectional view of the type shown in FIG. 1, but with the mold inserts fully closed in the position they are in during the molding of a lid.

FIGS. 1 and 2 are enlarged, fragmentary section views which further illustrate the cooperation between the mold inserts and the previously molded pour spout to permit fusing of the lid wall to an annular rim and flange of the pour spout while protecting the thin wall section 32 of the pour spout 20 against contact by molten plastic. FIG. 1 shows the mold inserts 14 and 16 are an almost but not fully closed position, while FIG. 2 shows the mold inserts in a fully closed position. As shown in FIG. 2 and the other drawings showing the mold inserts 14 and 16 fully closed, it should be understood that the pinching of the thin spout wall section 32 between the outer annular portion 42 of the insert 14 and the opposing wall of the insert 16 occurs at two different annular areas. One such annular area is at the extreme outer end of the annular portion 42 of insert 14, and the other are slightly around the corner of 42 and below the projection 42 viewed in FIG. 2. Thus, two redundant annular pinching areas are created.

As previously described, the molded pour spout used the present invention must have a relatively thick or rigid section at its lower end for fusing to the wall of the lid. However such relatively thick spout section need not take the form of the rim 34 and flange 36 described in the foregoing preferred embodiment.

What is claimed is:

1. A plastic lid for sealing the open top of a plastic bucket, said lid having a plastic pour spout for sealing said open top, said open top being formed by a surrounding wall of said lid, said pouring spout is fused to said surrounding wall of said lid during the molding of said lid, said pour spout having a relatively thick base portion which is fused around its periphery in direct contact to said surrounding wall during the molding of said lid.

2. A plastic lid as defined in claim 1 where said relatively thick base portion is the only portion of said pour spout which is fused to said lid, and other portions of said pour spout include a thin, flexible annular member which permits said pour spout to be moved between extended and collapsed positions.

3. A plastic lid as defined in claim 1 where said relatively thick base portion of said pour spout includes a relatively thick annular rim.

4. A plastic lid as defined in claim 3 where an annular flange is formed on the outside of said annular rim, said annular flange being substantially covered by molten plastic during the molding of said lid to fuse said annular flange to said surrounding wall of said lid.

5. A plastic lid as defined in claim 1 where said pour spout includes a thin, flexible annular portion, said base portion, and a neck formed integral with an outer end of said thin, flexible portion, said neck being movable between an collapsed and an extended position as permitted by said thin, flexible portion.

6. A plastic lid as defined in claim 5 where said base portion includes a relatively thick annular rim.

7. A plastic lid as defined in claim 6 where said rim has an annular flange extending around the outside thereof, said flange being substantially covered by plastic during the molding of said lid to fuse said annular flange to said surrounding wall of said lid.

8. A plastic lid for sealing the open top of a plastic bucket, said lid or bucket having a plastic pour spout which is fused around its periphery in bonded direct contact to a surrounding wall during the molding of said lid or said bucket, said relatively thick base portion being the only portion of said pour spout which is fused to said lid or bucket, and other portions of said pour spout include a thin, flexible annular portion integral with said base portion, and a neck at an outer end of said thin, flexible portion, said neck being movable between collapsed and extended positions as permitted by said thin, flexible portion.

9. A plastic lid as defined in claim 8 where said thin, flexible neck is threaded to receive a closure cap.

10. A plastic lid as defined in claim 8 further including a tab located on the top portion of the pour spout and a thin section on a cylindrical portion of the spout.

11. A plastic lid as defined in claim 8 where the flange of the pour spout has a tip in aid of fusion of the spout with the lid.

12. A plastic lid as defined in claim 8 wherein the spout being located on the lid.

13. A plastic lid as defined in claim 8 wherein the spout being located on the body of the bucket.

14. A pour spout for sealing a pour opening formed by a surrounding wall of a portion of a plastic container comprising a plastic pour spout being fused in sealed relationship to the surrounding wall at a position within the pour opening, said pour spout having a relatively thick base portion which is fused in direct bonded contact with the surrounding wall during the molding of the portion of the container as result of the container hardening during the molding process, said thick base portion being the only portion of said pour spout which is fused to the container, said pour spout includes a thin, flexible annular portion integral with said base portion, and said thin, flexible portion being movable between collapsed and extended positions.

15. The pouring spout as defined in claim 14 wherein said base portion is fused to said surrounding surface of the container during hardening of the container from a molten state during molding.

16. The pouring spout as defined in claim 14 wherein said portion of a plastic container is a lid.

17. The pouring spout as defined in claim 14 wherein said portion of a plastic container is on the body of the container.

\* \* \* \* \*